(No Model.)
M. W. DEWEY.
METHOD OF TRANSFORMING AND UTILIZING ELECTRICAL ENERGY.
No. 418,912. Patented Jan. 7, 1890.
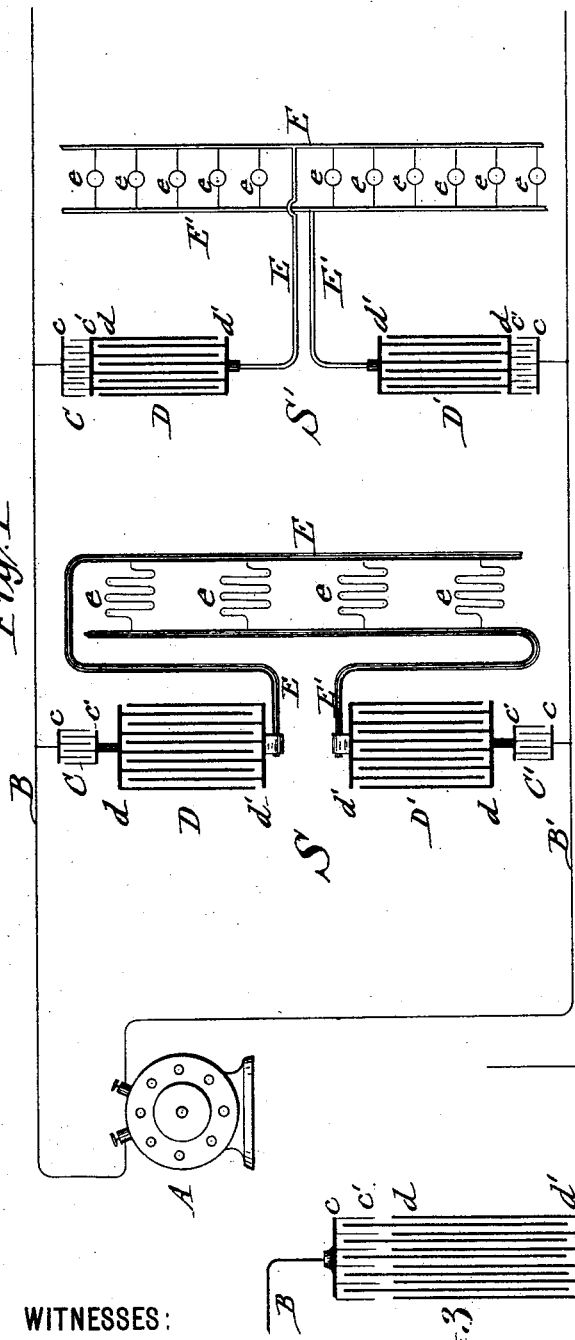
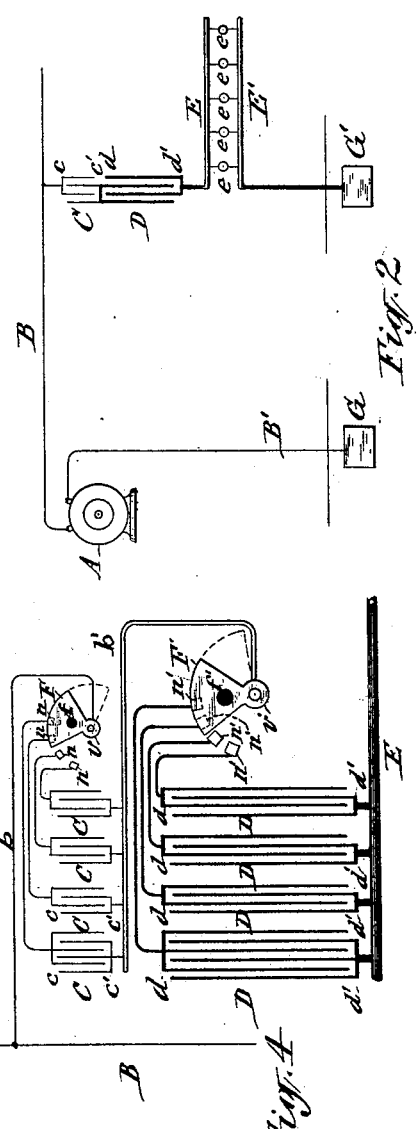
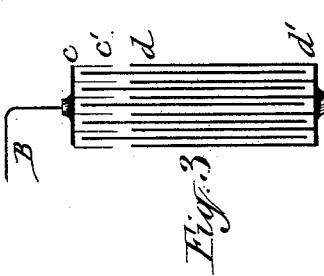
WITNESSES:
J. J. Laass
A. F. Walz
INVENTOR:
Mark W. Dewey
BY
Duell, Lass & Duell
ATTORNEYS

United States Patent Office.

MARK W. DEWEY, OF SYRACUSE, NEW YORK, ASSIGNOR TO THE DEWEY CORPORATION, OF SAME PLACE.

METHOD OF TRANSFORMING AND UTILIZING ELECTRICAL ENERGY.

SPECIFICATION forming part of Letters Patent No. 418,912, dated January 7, 1890.

Application filed September 30, 1889. Serial No. 325,575. (No model.)

*To all whom it may concern:*

Be it known that I, MARK W. DEWEY, of Syracuse, in the county of Onondaga, in the State of New York, have invented new and useful Improvements in the Method of Transforming and Utilizing Electrical Energy, of which the following, taken in connection with the accompanying drawings, is a full, clear, and exact description.

In a system of transformation and distribution of electrical energy by means of condensers it is very essential, especially when the transformation is to be great, while the total primary energy is maintained or substantially maintained, that the transformed charge be induced simultaneously and instantaneously with and by the primary charge. It is important also that the member or members of the condenser holding the transformed charge should have a conductivity proportional to the capacity, so that it will offer but very little resistance, and, further, to afford perfect regulation of the supply and transformation of electricity the surface areas of the condensers should be variable. If to one of two metallic sheets or plates separated by a thin sheet of insulating material—as mica, paraffined paper, or other suitable substance—a charge of electricity be imparted from a source, an equal charge, but of opposite sign, will be induced on the other place if their exposed surface areas are the same. It is quite impossible to form a condenser having but two members so that one member will expose a much greater inductive surface than the other; otherwise it would be a very simple matter to effect transformation, as, of course, this depends upon the relative exposed surfaces of the members. If one member of the same condenser is formed with a greater surface than the other, it is immaterial for the purpose of transformation if the exposed inductive surface is not greater in one than the other. The only exception to this is, that a charge may be induced on a part or parts of an uninsulated enlarged member. Then, by insulating the latter and discharging the inducing member, allowing the induced charge to spread over the enlarged surface, the latter member can be discharged at a reduced potential; but if both members are simultaneously discharged and while the large surface member is left uninsulated, as has been proposed, the electricity would not spread over the entire enlarged surface before discharging itself, but would discharge itself instantly at a tension or electro-motive force very nearly if not as great as that of the discharge of the inducing member.

To this end my invention consists, broadly, in charging a member of a condenser with electricity and simultaneously therewith and thereby inducing a transformed charge of electricity on another member of a condenser, and then discharging the transformed charge through suitable electric translating or consumption devices.

In order to carry out my invention I use in some cases two condensers or their equivalent at each consumption-station, and in other cases these condensers are duplicated. When using but two condensers, one has a larger capacity or surface area than the other, and, preferably, the one having the largest capacity has also a higher conductivity, their connection with the source of electricity and consumption-conductor depending of course upon whether the potential of the primary charge is to be increased or reduced. If the potential is to be increased, the large surface condenser is connected with the main line and the small surface condenser is connected to the consumption-conductor, with a suitable electrical connection between the two condensers; but if the potential is to be reduced the connection of the condensers to the line and consumption conductors are reversed, or as shown in the drawings.

In the drawings herewith, Figure 1 represents a diagram showing a plan of my system when two sets of condensers are employed at each consumer's station. Fig. 2 shows a plan of the system when but one set is used. Fig. 3 is a modification of a set of condensers formed into a double condenser, and Fig. 4 shows means for varying the surface area or capacity of the condensers.

Referring specifically to the drawings, A is an alternating-current dynamo-electric machine, and B and B' are main lines extending therefrom to the consumption-stations. But two of these stations S and S' are represented in the figure, and are sufficient to illustrate the principles of my invention.

At station S and between the main lines B and B' are located the electrostatic condensers or transformers.

C and C' indicate the small surface or capacity condensers, and D and D' the large surface or capacity condensers. One member of each of the small surface-condensers is connected to one of the main lines—the member $c$ of C with line B, and member $c$ of C' with line B'. The other members $c'$ of said condensers are each connected to one of the members of the large surface condensers—$c'$ of C with $d$ of D, and $c'$ of C' with $d$ of D'. The members $d'$ of the large surface condensers are connected to the terminals of the consumption or low-resistance supply-conductors E and E', and between these conductors are indicated electric translating devices $e\ e\ e$, &c., in the form of heaters.

Electric heaters are often and preferably formed so as to require a current of very great volume and low tension similar to the current employed for welding purposes. This current is produced from a high-tension current of small volume by my method of electrostatic transformation. The two members of each condenser have the same surface area. The difference in the surface area between the small and large condensers depends upon the extent of the transformation or conversion of the qualities of the current required. For instance, if the electricity is to be transformed, so that the voltage will be reduced from five hundred to one hundred and the ampères increased from one hundred to five hundred, the capacity or surface area of the members of the large condenser should be five times greater than the surface area of the small condenser. The number of plates or sheets in the large condenser may be greater or less than the number of plates or sheets in the small condenser without very materially changing the transformation, providing the capacity or surface area in each remains the same. The conductivity, however, of the large condenser should be good or better than is necessary for the small condenser, so that it will be able to conduct freely the current of great volume thereto and therefrom without heating or waste of energy. The only difference in the apparatus at S' is that a large and a small condenser are combined in one, members $c'$ and $d$ being directly connected together to make the apparatus more compact, and the translating devices $e\ e\ e$, &c., indicate incandescent lamps. The extent of transformation for the lamps not being as great as that required for the heaters at S, the surface areas of condensers D and D' are not as great as the condensers at station S.

Fig. 2 shows one terminal of generator A connected to ground G by conductor B', and but one set of condensers employed at a consumption-station, one having a small surface and the other a large surface, connected together, as at S' of Fig. 1. The member $d'$ of the large condenser is connected to the low-resistance conductor E on one side of the lamps, as before; but the low-resistance conductor E' is connected to ground G'.

Fig. 3 shows a modification of a double condenser, (represented at S' of Fig. 1,) the only difference being that each terminal member has the same number of plates, allowing the opposite or interior plates $c'$ and $d$ to be formed in one set. A small portion of the plates in inductional proximity to the member $c$ constitutes the member $c'$, and the larger portion in inductional proximity to $d'$ constitutes the member $d$. The inner plates in this case are of superior conductivity to $c$ even at the portion or portions in inductive proximity to the same; but it will be obvious that they may be constructed thinner at this portion than the other, if desirable.

In Fig. 4, C C C C represent a series of small-capacity condensers connected to line B through a switch for regulating the charge by varying the extent of the surface of the inducing members $c\ c\ c\ c$. F designates a pivoted quadrant-shaped switch-arm having an insulated handle $f$, and arranged to bridge one or all the terminals $n\ n\ n\ n$, so as to vary the quantity of the charge. This switch-arm is in circuit with the main line B through its pivot $v$ and conductor $b$. The members $c'\ c'$, &c., of the condensers C C, &c., are connected to conductor $b'$, leading to the pivot $v'$ of another switch F', similar to that hereinbefore described, and controlling the inductive surface of the large condensers D. The terminals $n'\ n'$, &c., of switch F' are connected to the members $d\ d\ d\ d$, each member having a separate terminal. Both switches are shown in the figure as moved to include two and cut out two condensers in each series. The members $d'\ d'\ d'\ d'$ of the condensers D are electrically connected to a low-resistance supply-conductor.

The electrical connections, switches, &c., may be changed according to the requirements of my system without departing from the spirit of my invention, as the said invention is susceptible of many modifications and its scope is not confined to the specific forms or arrangements shown and described herein.

The operation, briefly, is as follows: The alternating-current generator A produces an alternating current and alternately charges both sides of the line, when two lines are employed, as in Fig. 1, with a potential, say, of five hundred volts above and below zero. When one line is charged above zero, the other is below, and vice versa. If the first impulse in the lines charges line B positively and line B' negatively, the members $c\ c$ of condenser C will be charged with positive electricity to five hundred volts, and the members $c$ of C' will be charged with negative electricity to five hundred volts. The charging of said members induces like charges, but opposite in sign on their corresponding members in the same condensers. Simultaneously therewith and thereby is induced upon the members $d\ d$ of condensers D and D' charges of much lower voltage and greater volume than is present in condensers C and C', depending upon the proportion of their surface areas and conductivity. If the surface areas or capacities of condensers D and D' are five times larger than the surface areas or capacities of condensers C and C', the qualities of the current will be changed accordingly; or, in other words, the voltage will be reduced to one hundred, and the number of ampères will be increased to five times the number transmitted on the main lines. The charges on the members $d\ d$ of condensers D and D' induce like charges, but opposite in sign on their corresponding members $d'\ d'$ in the same condensers, and these latter plates or members, being oppositely charged with transformed or converted electricity, discharge themselves one into the other, or exchange their electricity very rapidly and with every reversal of the current in the main lines. The translating devices $e\ e\ e$, &c., being connected between the supply-conductors E and E', leading from the terminals of the members $d'\ d'$, receive both the charges and discharges of electricity through them, consuming the energy thereof. The total energy in this case will of course be doubled.

It is obvious that if the condensers above referred to are provided with the means shown in Fig. 4 for varying the surface of the plates the tension and volume of the current through the translating devices can be regulated and adjusted as required.

Having described my invention, what I claim as new, and desire to secure by Letters Patent, is—

1. The method of transformation and utilization of electrical energy, consisting in charging one member of a condenser with electricity of high tension and small volume, thereby inducing a like charge on the other member, and simultaneously therewith and thereby charging the member of another condenser with electricity of low tension and great volume, and then discharging the condensers and passing the transformed electricity through one or more electric translating devices.

2. The method of transformation and utilization of electrical energy, consisting in charging one member of a condenser with electricity having certain qualities, thereby inducing a like charge on the other member, and simultaneously therewith and thereby charging the members of another condenser with electricity having qualities different from those possessed by the electricity of the former condenser, and then discharging the condensers and passing the transformed electricity through one or more electric translating devices.

3. The method of transformation and utilization of electrical energy, consisting in charging one member of a condenser with electricity of high tension and small volume, and simultaneously therewith and thereby charging a member of a condenser with electricity of low tension and great volume, and then discharging the latter and passing the transformed electricity through one or more electric translating devices.

4. The method of transformation or conversion of electrical energy, consisting in alternately charging and discharging a member of a condenser with positive and negative electricity, respectively, having certain qualities, and simultaneously therewith and thereby alternately charging and discharging a member of a condenser with positive and negative electricity, respectively, having different qualities from those possessed by the electricity of the former, and passing the alternate charges and discharges of transformed or converted electricity through one or more electric translating devices.

5. The method of transformation and utilization of electrical energy, consisting in charging one member of a condenser having a small surface area with electricity, thereby inducing a charge on another member having like surface area, and simultaneously therewith and thereby charging the members of another condenser having greater surface area than the former, and then discharging the latter or greater surface area condenser and passing the electricity therefrom through electric translating devices.

6. The method of transformation and utilization of electrical energy, consisting in charging one member of a condenser having a small surface area with electricity, thereby inducing a charge on another member having like surface area, and simultaneously therewith and thereby charging the members of another condenser having greater surface area and conductivity than the former, and then discharging the latter or greater surface-area condenser, and passing the electricity therefrom through low-resistance supply-conductors to electric translating devices.

7. The method of transformation of electrical energy, consisting in inducing electrostatically by a current of a certain tension and volume a current of a different tension and volume without changing materially the total energy of the inducing-current.

8. The method of transformation of electrical energy, consisting in electrostatically and by a current of a certain electro-motive force and volume inducing simultaneously therewith a current of a different electro-motive force and volume and maintaining the same or approximately the same total energy in the induced current.

9. The method of transformation and utilization of electrical energy, consisting in charging a member of a condenser with electricity of a certain tension and volume, and simultaneously therewith and thereby charging a member of a condenser with electricity of different tension and volume, and then discharging the latter and passing the transformed electricity to one or more electric translating devices.

10. The method of transformation or conversion of electrical energy, consisting in charging a member of a condenser with electricity, and simultaneously therewith and thereby charging a member of a condenser with electricity of different tension, and then discharging both members.

11. The method of transformation and utilization of electrical energy, consisting in charging one member of a condenser having a variable surface area with electricity, thereby inducing a like charge on the other member, and simultaneously therewith and thereby charging the members of another condenser having a variable surface area with electricity having different qualities from those possessed by the electricity of the former condenser, and then discharging the condensers and passing the transformed electricity through one or more electric translating devices.

12. The method of transformation and utilization of electrical energy, consisting in charging the members of a condenser with electricity, and simultaneously therewith and thereby charging the members of another condenser having a variable surface area with electricity, and then discharging the latter through one or more electric translating devices, and varying the tension and volume of the discharge by varying the surface area of the latter condenser.

13. The method of transformation and utilization of electrical energy, consisting in charging two condensers of like capacity with electricity, simultaneously therewith and thereby charging two other condensers of like capacity but different from that of the former two, discharging the latter two condensers, and passing the transformed electricity therefrom through one or more electric translating devices.

14. The method of transformation and utilization of electrical energy, consisting in charging one of the members of each of the condensers of like capacity with electricity, simultaneously therewith and thereby charging one of the members of each of two condensers of like capacity but differing from the capacity of the former members, discharging the latter two members, and passing the transformed electricity therefrom through one or more electric translating devices.

15. The method of transformation and utilization of electrical energy, consisting in charging two condensers of like but small capacity with electricity, and simultaneously therewith and thereby charging two other condensers of like but greater capacity than the former two, discharging the great capacity condensers and passing the electricity therefrom through low-resistance supply-conductors to electric translating devices.

16. The method of transformation and utilization of electrical energy, consisting in charging two condensers of like but small capacity and low conductivity with electricity, and simultaneously therewith and thereby charging two other condensers of like but greater capacity and conductivity than the former two, discharging the great capacity condensers, and passing the electricity therefrom through low-resistance supply-conductors to electric translating devices.

In testimony whereof I have hereunto signed my name this 28th day of September, 1889.

MARK W. DEWEY. [L. S.]

Witnesses:
C. H. DUELL,
A. F. WALZ.